(12) United States Patent
Suzuki et al.

(10) Patent No.: US 11,651,798 B2
(45) Date of Patent: May 16, 2023

(54) BASE MEMBER AND METHOD OF MANUFACTURING THE SAME, SPINDLE MOTOR, AND HARD DISK DRIVE DEVICE

(71) Applicant: MINEBEA MITSUMI Inc., Nagano (JP)

(72) Inventors: Akihiko Suzuki, Nagano (JP); Tadashi Akahori, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/490,634

(22) Filed: Sep. 30, 2021

(65) Prior Publication Data

US 2022/0130428 A1 Apr. 28, 2022

(30) Foreign Application Priority Data

Oct. 28, 2020 (JP) .............................. JP2020-180229

(51) Int. Cl.
*G11B 33/02* (2006.01)
*B22D 19/10* (2006.01)

(52) U.S. Cl.
CPC .............. *G11B 33/02* (2013.01); *B22D 19/10* (2013.01)

(58) Field of Classification Search
None
See application file for complete search history.

(56) References Cited

U.S. PATENT DOCUMENTS

| 5,235,571 | A | * | 8/1993 | Ellermeier | ............ | G11B 25/063 |
| 5,459,627 | A | * | 10/1995 | Peter | ...................... | G11B 17/02 |
| | | | | | | 310/67 R |
| 6,470,550 | B1 | * | 10/2002 | Kowalczyk | ............ | B22D 19/10 |
| | | | | | | 228/122.1 |
| 8,196,284 | B2 | | 6/2012 | Uefune et al. | | |
| 9,336,817 | B1 | * | 5/2016 | Hirasawa | .............. | G11B 25/043 |
| 10,957,363 | B1 | * | 3/2021 | Brand | ................ | G11B 33/1486 |
| 2004/0184178 | A1 | * | 9/2004 | Asano | .................. | G11B 33/148 |
| 2008/0020185 | A1 | * | 1/2008 | Macatangay | .......... | G11B 33/08 |
| | | | | | | 428/161 |
| 2009/0241322 | A1 | * | 10/2009 | Uefune | ................ | G11B 33/148 |
| | | | | | | 29/603.01 |
| 2019/0093234 | A1 | * | 3/2019 | Sakurada | ............ | C23C 18/1803 |
| 2020/0185003 | A1 | * | 6/2020 | Ino | ........................ | G11B 33/121 |
| 2022/0068305 | A1 | * | 3/2022 | Showa | ................ | G11B 33/148 |
| 2022/0262399 | A1 | * | 8/2022 | Ito | ...................... | G11B 19/2009 |
| 2022/0262408 | A1 | * | 8/2022 | Ito | .......................... | B22D 19/10 |

FOREIGN PATENT DOCUMENTS

| JP | 2009-245570 | A | | 10/2009 | | |
| JP | 2012012518 | A | * | 1/2012 | ......... | G11B 19/2018 |
| JP | 2017-075340 | A | | 4/2017 | | |
| JP | 2020095765 | A | * | 6/2020 | ......... | G11B 19/2018 |

\* cited by examiner

*Primary Examiner* — William J Klimowicz
(74) *Attorney, Agent, or Firm* — Pearne & Gordon LLP (57) ABSTRACT

A base member serving as a part of a housing of a hard disk drive device. The base member includes a base body being a cast product, a machined surface obtained by machining a part of the base body at a side of an interior of the housing, an impregnating agent filled into a casting cavity exposed at the machined surface, and a coating film covering a surface including the machined surface of the base body.

10 Claims, 5 Drawing Sheets

BASE MEMBER AND METHOD OF MANUFACTURING THE SAME, SPINDLE MOTOR, AND HARD DISK DRIVE DEVICE

CROSS REFERENCE TO RELATED APPLICATION

This application claims the benefit of priority to Japanese Patent Application Number 2020-180229 filed on Oct. 28, 2020. The entire contents of the above-identified application is hereby incorporated by reference.

BACKGROUND OF THE INVENTION

Technical Field

The present disclosure relates to a base member of an electronic device such as a hard disk drive device, and particularly relates to a technique for sealing a casting cavity exposed at a surface of the base member. Furthermore, the present disclosure relates to a spindle motor and a hard disk drive device using the base member described above.

Background Art

A base plate of a hard disk drive device is generally manufactured by performing die casting of aluminum. In the die casting, a draft is provided in a mold to facilitate the removal of a molded product from the mold. As a result, an inclined surface corresponding to the draft is formed in the molded product. Meanwhile, a distance between an outer peripheral edge of a hard disk and a disk facing surface of the base plate affects rotational accuracy of the hard disk. As a result, the disk facing surface of the base plate is machined as necessary, and the distance between the disk facing surface and the hard disk is adjusted (for example, see paragraphs of 0008, 0011, 0012, and the like in Japanese Unexamined Patent Application Publication No. 2009-245570). Furthermore, in order to prevent dust and the like from the surface of the base plate from occurring, a major part of the base plate is covered by electrodeposition coating.

Incidentally, in the die casting, a cavity (casting cavity) is formed inside the molded product. In the die-casted state, the casting cavity does not appear at the surface due to a chill layer on the surface of the molded product, but when the chill layer is removed by machining, the casting cavity may appear at the disk facing surface. As a technique for sealing such a casting cavity, it has been proposed to impregnate epoxy-based resin into the casting cavity by electrodeposition coating (for example, see abstract of Japanese Unexamined Patent Application Publication No. 2017-75340).

However, according to the study by the present inventors, it has been found that when the casting cavity is open to the surface, the casting cavity is not sealed by electrodeposition coating, and defects occur later. In particular, when the opening of the casting cavity is small (equal to or smaller than 20 μm), an electrodeposition coating material does not sufficiently impregnate into the casting cavity. That is, in the electrodeposition coating, an electrodeposition coating film is formed so as to close the opening portion of the casting cavity by a coating solution having viscosity, and the electrodeposition coating film is cured in a state where the casting cavity inside the electrodeposition coating film is a gap. Furthermore, when an inclusion such as aluminum carbide in aluminum is exposed in the gap, there is concern that the moisture having intruded into the casting cavity due to cleaning by water at the time of the electrodeposition coating and the inclusion may gradually react, and a gas component containing carbon may be produced. When the pressure inside the gap rises due to this gas component, the electrodeposition coating film covering the opening portion of the casting cavity may be destroyed. In this case, fine particles such as aluminum oxide and aluminum hydroxide produced by the reaction may be released into the interior of the device. Such occurrence of dust leads to failures such as read and write errors from and to the hard disk. In particular, the disk facing surface of the base plate is close to the hard disk or a read/write head, so the occurrence of dust from the disk facing surface has to be avoided as much as possible.

SUMMARY OF THE INVENTION

The present disclosure is made in consideration of such a situation, and one or more aspects of the present disclosure are directed to a base member capable of maintaining its condition after a casting cavity exposed at a surface of the base member is sealed, and suppressing discharge of dust into an interior of a device.

One aspect of the present disclosure relates to a base member serving as a part of a housing of a hard disk drive device. The base member includes a base body being a cast product, a machined portion obtained by machining a part of the base body at a side of an interior of the housing, an impregnating agent filled into a casting cavity exposed at the machined portion, and a coating film covering a surface including the machined portion of the base body.

Another aspect of the present disclosure relates to a method of manufacturing a base member serving as a part of a housing of a hard disk drive device. The method includes molding a base body by casting, machining a part of the base body at a side of an interior of the housing and forming a machined portion, impregnating by filling an impregnating agent into a casting cavity exposed at the machined portion after the machining, and coating by forming a coating film at a surface including the machined portion of the base body.

According to the present disclosure, since the casting cavity is filled with the impregnating agent, a gap is not formed in the casting cavity at an inner side of the coating film or an inclusion is covered with the impregnating agent even when a gap is formed. Thus, an amount of a gas component produced is small, and it is possible to suppress the breakage of the coating film due to the pressure of the gas component. As a result, the discharge of dust into the interior of the device can be suppressed.

Still another aspect of the present disclosure relates to a spindle motor provided with the base member described above, and is a hard disk drive device provided with the spindle motor.

According to the present disclosure, it is possible for a condition after sealing the casting cavity exposed at the surface of the base member to be maintained, and to suppress the discharge of dust into the interior of the device. Furthermore, when the base member is used in a hard disk drive device enclosed with low density gas in the interior, leakage of the low density gas to the outside can be suppressed.

DESCRIPTION OF THE PREFERRED EMBODIMENTS

1. Configuration of Base Member

Figure 1:
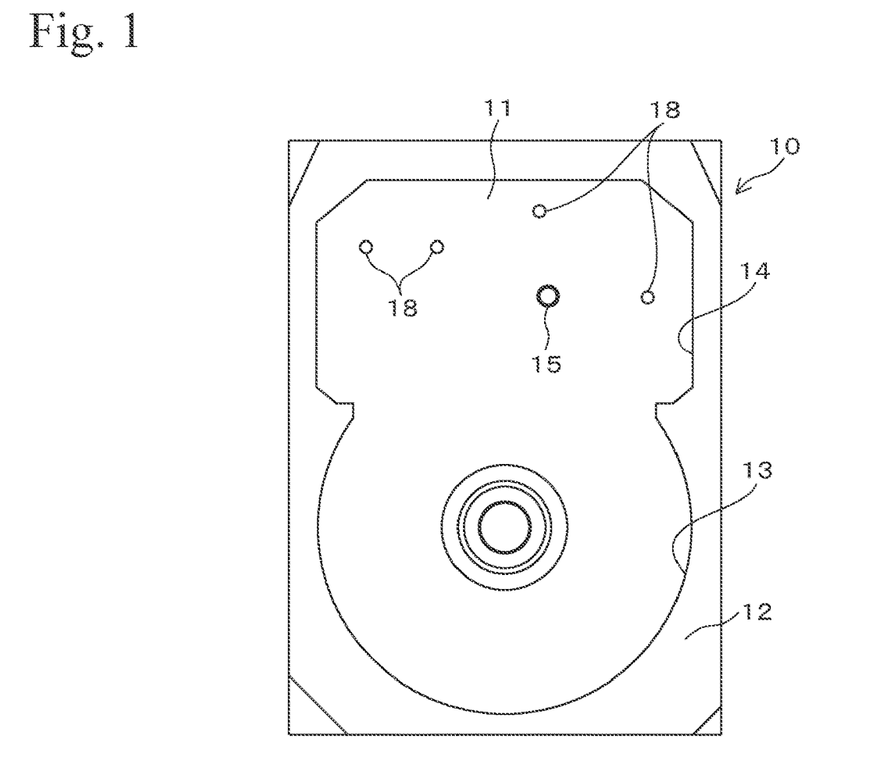
FIG. 1 is a plan view illustrating a base member according to an embodiment of the present disclosure.
Figure 2:
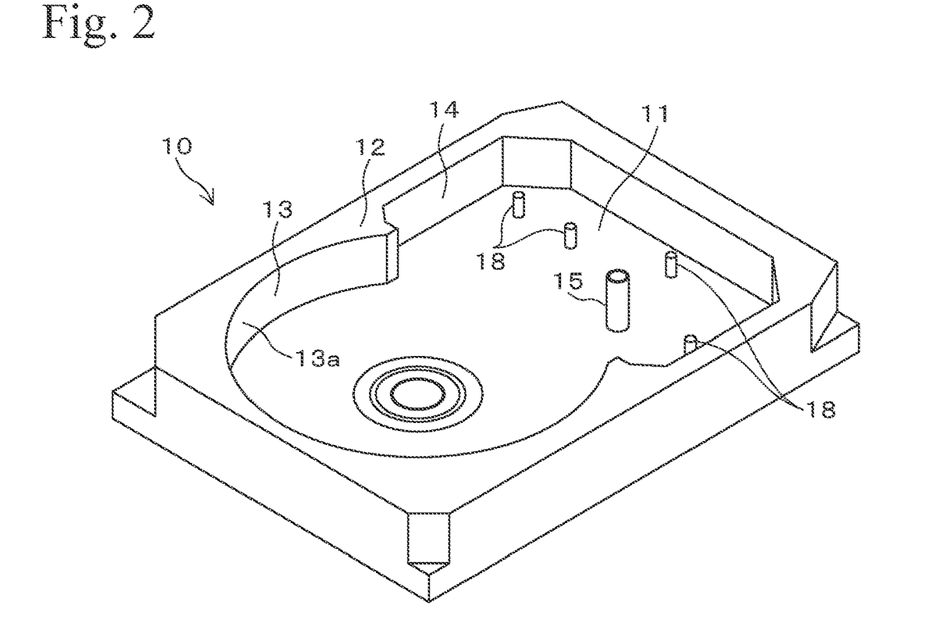
FIG. 2 is a perspective view illustrating a base member according to an embodiment of the present disclosure.

An embodiment of a base member according to the present disclosure will be described with reference to FIGS. 1 and 2. In the figures, a reference sign 10 indicates the base member (base body) according to an embodiment, and the base member 10 is manufactured by die casting of aluminum. A reference sign 11 indicates a bottom portion, and the bottom portion 11 has a rectangular plate shape having short sides and long sides. A side wall portion 12 extending in a direction orthogonal to the bottom portion 11 is formed at an entire periphery of the bottom portion 11.

The side wall portion 12 includes a circular portion 13 having an inner peripheral surface shape formed along a shape of a hard disk, and a rectangular portion 14 having a rectangular shape and configured to accommodate a mechanism for writing and reading data to and from the hard disk. In the die-casted state, an inner circumferential surface of the circular portion 13 and the rectangular portion 14 is inclined so as to slightly expand upward, corresponding to the draft of the mold. The inner circumferential surface (disc facing surface) of the circular portion 13 is machined to form a machined surface (machined portion) 13a orthogonal to the bottom portion 11. The machined surface 13a has a predetermined uniform distance from an outer peripheral edge of the hard disk.

In the figures, a reference sign 15 indicates a shaft to be used when the base member 10 is used in the hard disk drive device, and a reference sign 18 indicates a columnar support for fixing a reading/writing mechanism for data of the hard disk drive device. Since the base member 10 in this embodiment is used in a hard disk drive device enclosed with low density gas such as helium gas inside, the shaft 15 and the columnar supports 18 are casted by die casting integrally with the base member 10 to prevent leakage of the gas. The present disclosure is not limited to such a hard disk drive device. Accordingly, a hard disk drive device may be a configuration in which screw holes are formed in the bottom portion 11 of the base portion 10, and then, the shaft 15 and the columnar supports 18 are attached to the screw holes, or the shaft 15 and the columnar supports 18 are press-fitted into recess parts or through holes formed in the bottom portion 11 of the base portion 10.

The base member 10 has been subjected to impregnation processing. The impregnation processing is vacuum pressure impregnation processing to be described in detail later, and the cured impregnating agent is filled in the casting cavity being open to the machined surface 13a. Note that the impregnation processing is not limited to the vacuum pressure impregnation processing, and any impregnation processing method such as vacuum impregnation processing without pressurizing, and immersion and impregnation processing of immersing the base member 10 in the impregnating agent can be employed.

Figure 6A:
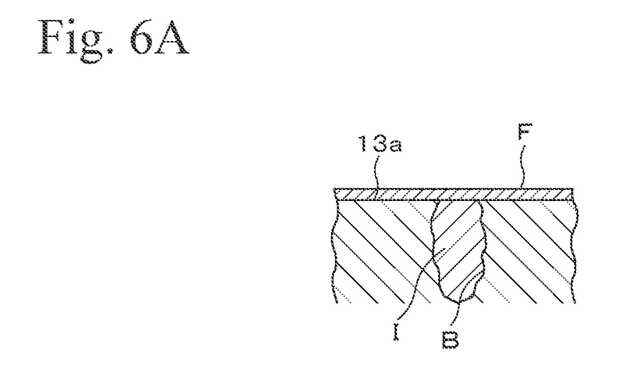
FIGS. 6A to 6C are cross-sectional views illustrating a state of an impregnating agent and an electrodeposition coating film in a casting cavity in an embodiment of the present disclosure.
Figure 6B:
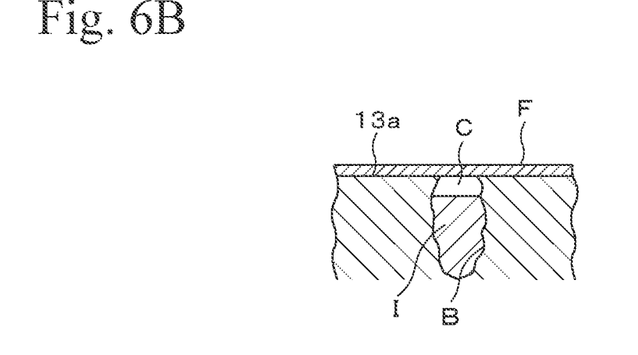

The entire surface of the base member 10 has been subjected to electrodeposition coating. This electrodeposition coating prevents occurrence of dust from the surface of the base member 10. Note that the coating method is not limited to electrodeposition coating, and may be powder coating, spray coating, brush coating, or plating coating such as electroless nickel plating. As illustrated in FIG. 6A, the machined surface 13a is covered with an electrodeposition coating film F by electrodeposition coating, and an impregnating agent I is also covered with an electrodeposition coating film. Additionally, as illustrated in FIG. 6B, when the surface of the impregnating agent I is positioned further toward the inner side than an opening portion of a casting cavity B, a gap C may be formed between the electrodeposition coating film F and the surface of the impregnating agent I.

In the base member 10 having the configuration described above, the impregnating agent I is filled in the casting cavity B, so the gap C is not formed in the casting cavity B being inside the electrodeposition coating film F, or an inclusion is covered with the impregnating agent even when the gap C is formed. Thus, an amount of the gas component produced is small, and it is possible to suppress the breakage of the coating film due to the pressure of the gas component. As a result, the discharge of dust into the interior of the device can be suppressed.

2. Method of Manufacturing Base Member

Figure 5:
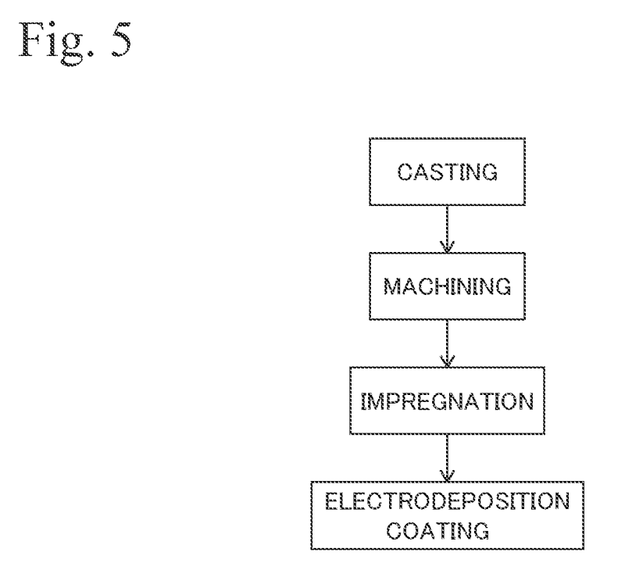
FIG. 5 is a flowchart illustrating a method of manufacturing a base member according to an embodiment of the present disclosure.

Next, a method of manufacturing the base member 10 described above will be described with reference to FIG. 5. FIG. 5 is a flowchart illustrating the method of manufacturing the base member 10.

(Casting)

Molten metal of aluminum is injected into a die casting mold having a cavity having the same shape as that of the base member 10. When the molten metal cools and solidifies in the cavity, the die casting mold is opened, the base member 10 is removed, and a remaining and solidified portion in a runner leading to a gate of the die casting mold is cut.

(Machining)

The inner circumferential surface of the circular portion 13 of the base member 10 is machined to form a machined surface 13a orthogonal to the bottom portion 11. As a result, the machined surface 13a has a predetermined uniform distance from the outer peripheral edge of the hard disk, and gives predetermined rotational accuracy of the hard disk.

(Impregnation)

The base member 10 is housed in an impregnation vessel, and after the interior is vacuumed, an impregnation agent is injected into the impregnation vessel to immerse the base member 10 in the impregnating agent. Then, after the interior pressure of the impregnation vessel is returned to atmospheric pressure, compressed air is injected to pressurize the interior of the impregnation vessel. As a result, the impregnating agent is filled in the casting cavity being open to the machined surface 13a. Next, the pressure in the impregnation vessel is reduced to atmospheric pressure, and the base member 10 is removed from the impregnation vessel. The surface of the base member 10 is attached with the impregnating agent, so this is cleaned and removed, and then, heat is applied to cure the impregnating agent filled in the casting cavity.

(Electrodeposition Coating)

The base member 10 is immersed in liquid obtained by dissolving, for example, water-soluble epoxy-based resin, and the resin is dried and thermally cured after the resin is adhered to the base member 10 by applying an electric current. By this electrodeposition coating, the entire surface of the base member 10 is covered with resin, and the occurrence of dust is suppressed at the surface of the base member 10.

Here, impregnation is preferably performed by vacuum impregnation, particularly vacuum pressure impregnation. In vacuum impregnation, the base body is housed in an impregnation vessel and the interior is vacuumed, and the impregnating agent is then injected into the impregnation vessel to return the interior pressure to atmospheric pressure. Due to this, the casting cavity is filled with the impregnating agent. In this case, after the interior pressure of the impregnation vessel is returned to the atmospheric pressure, vacuum pressure impregnation is performed by injecting and pressurizing compressed air, and thus, the impregnating agent is more deeply filled into the casting cavity. Note that the present disclosure is not limited to vacuum impregnation, and it is also possible to employ an impregnation processing method performed by only immersing the base body in the impregnating agent.

When an outermost diameter of the casting cavity exposed at the machined portion is equal to or smaller than 20 µm, the coating material does not sufficiently impregnate into the casting cavity even due to the impregnation by the electrodeposition coating. As a result, the electrodeposition coating film is destroyed due to the gas component generated in the gap inside the electrodeposition coating film, and the possibility of the discharge of dust from the gap is increased. In that regard, in the present disclosure, the impregnating agent is also filled into the casting cavity having the outermost diameter being equal to or smaller than 20 µm. As a result, the possibility of the breakage of the coating film covering the gap due to the pressure of the gas component is reduced. Acrylic resin or epoxy-based resin can be used as the impregnating agent, but other types of resin such as polyester resin and silicon-based resin can also be used. The viscosity of the impregnating agent is preferably about from several mPa·s to several tens of mPa·s.

In the method of manufacturing the base member 10, the method including the processes described above, the vacuum pressure impregnation processing is performed, and thus, all or most part of the casting cavity can be filled with the impregnating agent. Thus, no gap is formed in the casting cavity being inside the coating film, or even when the gap is formed, an inclusion is covered with the impregnating agent. Thus, an amount of a gas component produced is small, and it is possible to suppress the breakage of the coating film due to the pressure of the gas component.

3. Spindle Motor

Figure 3:
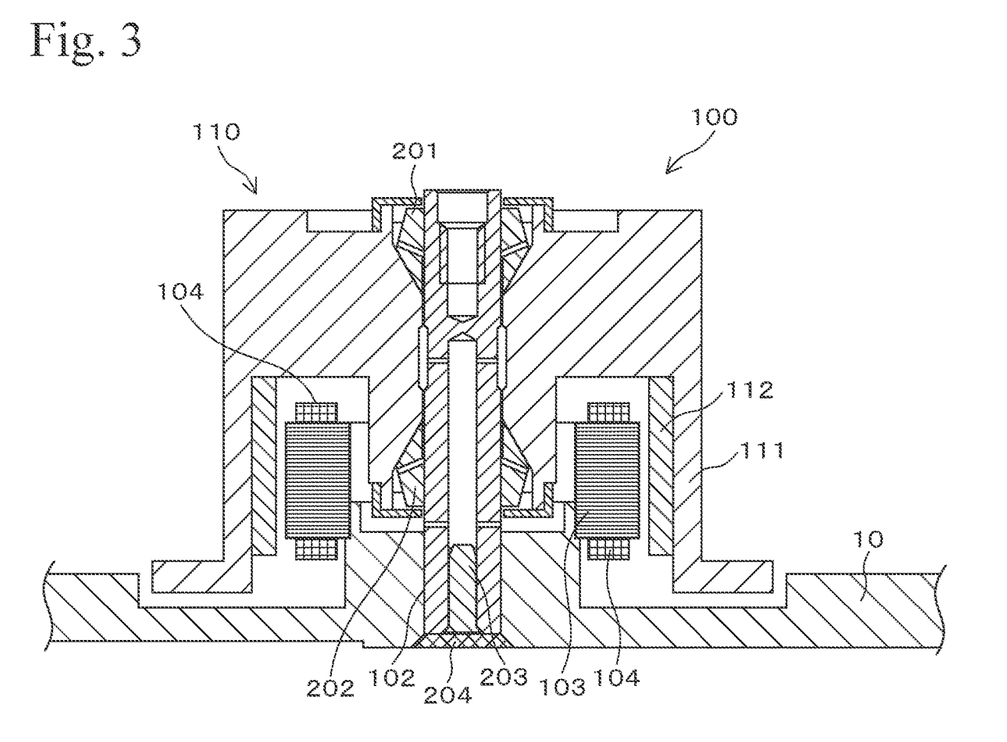
FIG. 3 is a cross-sectional view illustrating a spindle motor according to an embodiment of the present disclosure.

FIG. 3 is a cross-sectional view illustrating a spindle motor 100 using the base member 10 described above, according to an embodiment of the present disclosure. A shaft 102 made of metal and having a cylindrical shape is fixed to the base member 10 by a method of press fitting or the like. Also, a stator core 103 is fixed to the base member 10. The stator core 103 is formed by laminating a plurality of soft magnetic materials (for example, electromagnetic steel sheets) having a thin plate shape in an axial direction, and includes a plurality of pole teeth having an annular shape and protruding outward in a radial direction. The plurality of pole teeth are provided at equal intervals along a circumferential direction, and a coil 104 is wound around each pole teeth.

Bearing members 201 and 202 having a conical shape are fixed to the shaft 102, and a rotor 110 is rotatably supported on the bearing members 201 and 202. The rotor 110 includes an outer cylindrical portion 111, and a rotor magnet 112 having an annular shape is fixed to an inner circumferential surface of the outer cylindrical portion 111. The rotor magnet 112 is magnetized such that adjacent portions alternately have opposite polarities such as SNSN along the circumferential direction. An inner circumferential surface of the rotor magnet 112 faces an outer circumferential surface of the pole teeth of the stator core 103 across a gap. By applying a driving current to the coil 104, the rotor 110 rotates with respect to the shaft 102 and the stator core 103 fixed to the base member 10.

Additionally, a lower end hollow portion of the shaft 102 is inserted with a sealing member 203, such as a pin, and the sealing member 203 is fixed in the shaft 102 by a fixing member 204, such as an adhesive. The sealing member 203 and the fixing member 204 prevent the leakage of the low density gas inside the hard disk drive device from the shaft 102.

In the spindle motor 100 having the above-described configuration, the discharge of dust from the machined surface 13a of the base member 10 is suppressed, and thus, in a hard disk drive device incorporated with the spindle motor 100, occurrence of failures such as read and write errors from and to the hard disk is suppressed. Furthermore, the leakage of the helium gas to the outside through the casting cavity from the machined surface 13a is suppressed, so the leakage of the helium gas from the interior of the device can be also suppressed.

4. Hard Disk Drive Device

Figure 4A:
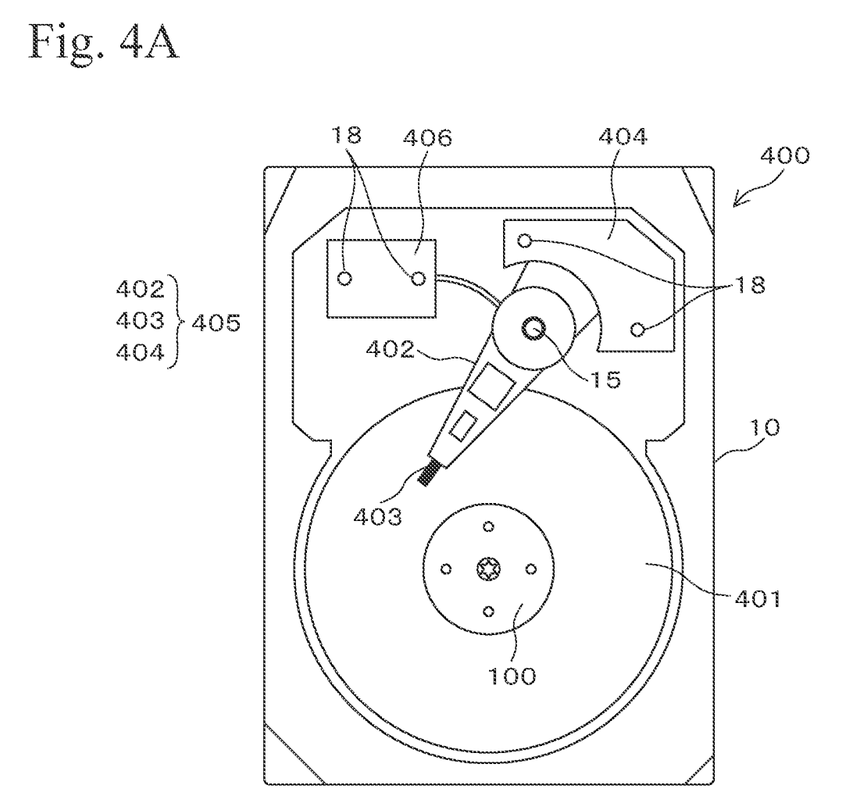
FIG. 4A is a plan view illustrating a hard disk drive device with a cover removed according to an embodiment of the present disclosure.
Figure 4B:
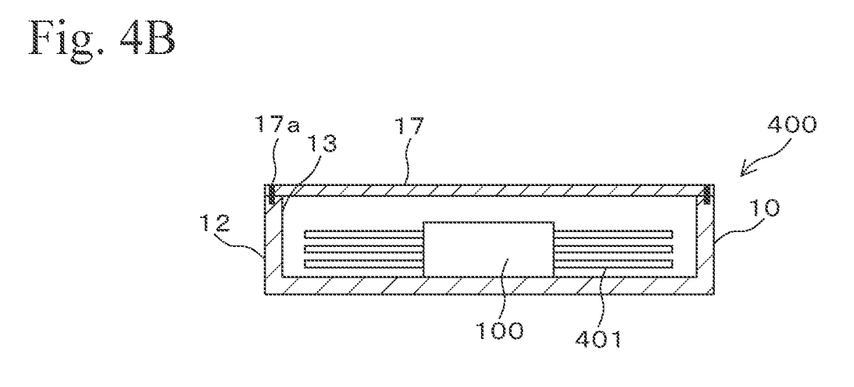
FIG. 4B is a cross sectional view illustrating a hard disk drive device according to an embodiment of the present disclosure.

FIG. 4 illustrates a hard disk drive device 400 using the spindle motor 100, according to an embodiment of the present disclosure. A plurality of hard disks 401 are attached to the spindle motor 100 at a distance from each other. A swing arm 402 is rotatably supported on the shaft 15 of the base member 10.

A tip portion of the swing arm 402 is attached with a magnetic head 403. Also, the swing arm 402 is swung by a driving mechanism 404. The driving mechanism 404 is attached to the columnar supports 18. Such a swing arm 402 is provided for each of the hard disks 401. A reading/writing mechanism 405 is configured to write and read data to and from the hard disks 401 by the swing arm 402, the magnetic head 403, and the driving mechanism 404. Note that a reference sign 406 indicates a circuit board configured to control the reading/writing mechanism 405, and the circuit board 406 is attached to the columnar supports 18.

As illustrated in FIG. 4B, the cover 17 is fixed to the upper surface of the side wall portion 12 of the base member 10 through a sealing member (not illustrated) such as a gasket. The cover 17 is welded to the entire circumference of the upper surface of the side wall portion 12 by a method such as laser welding, as illustrated as a welding bead 17a. Note that since the present disclosure is not limited to the hard disk drive device enclosed with the low density gas such as helium gas in the interior, the fixing method of fixing the cover 17 to the side wall portion 12 is not limited to the welding, and may be screwing or the like.

In the hard disk drive device 400 having the configuration described above, the hard disk 401 is rotated by the spindle motor 100, and writing and reading of data are performed by the magnetic head 403 to and from the hard disk 401. In the hard disk drive device 400 having the configuration described above, the discharge of dust from the machined surface 13a of the circular portion 13 of the base member 10 is suppressed, and thus, occurrence of failures such as read and write errors from and to the hard disk 401 is suppressed. Furthermore, the leakage of the helium gas to the outside through the casting cavity from the machined surface 13a is suppressed, so it is possible to suppress the leakage of the helium gas from the interior of the device.

5. Modified Examples

The present disclosure is not limited to the embodiments described above, and changes such as those to be described below are possible.

(1) The present disclosure is applicable to a hard disk drive device having a form not being enclosed with low density gas in the interior of the base member 10.

(2) The machined surface 13a is not limited to the inner circumferential surface of the circular portion 13, and can be set at any position such as the bottom surface of the base portion 11, and the inner circumferential surface of the rectangular portion 14.

Figure 6C:
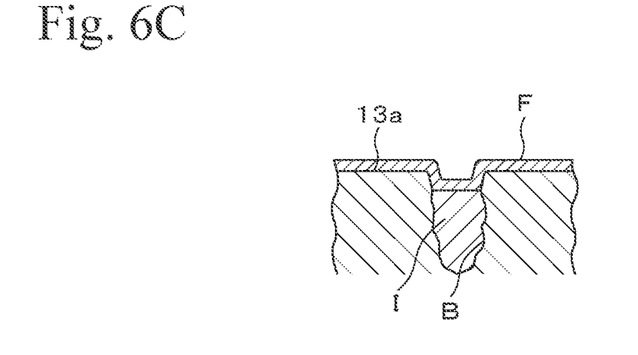

(3) When coating is performed by electrodeposition coating, electrically conductive resin can be used as the impregnating agent I. As a result, as illustrated in FIG. 6C, even when the surface of the impregnating agent I is positioned further toward the inner side than the opening portion of the casting cavity B, electrodeposition coating is performed up to the surface of the impregnating agent I, so no gap is formed. That is, when the impregnating agent of the electrically conductive resin is coated by electrodeposition coating, no gap is formed between the electrodeposition coating film and the impregnating agent. Examples of the electrically conductive resin include resin obtained by mixing electrically conductive materials such as graphite and metal, or an electrically conductive polymer material such as polyparaphenylene, or polypyrrole.

Examples

The effects of the present disclosure will be described by using specific examples.

The base member according to the embodiment of the present disclosure was manufactured by the manufacturing process illustrated in FIG. 5. Furthermore, as a Comparative Example, a base member was manufactured by the manufacturing process not performing the impregnation in FIG. 5. These base members were left to stand for one month after manufacturing to investigate the presence or absence of the breakage of the electrodeposition coating film at the machined portion.

In an Example and a Comparative Example, it was determined that the base member was defective when there was at least one destroyed portion of the electrodeposition coating film. As a result, the defect percentage was approximately 0.1% in the Comparative Example, but 0.03% in the Example. In this way, in the present disclosure, the breakage of the electrodeposition coating film covering the casting cavity can be suppressed, so the discharge of dust into the interior of the device can be suppressed.

The present disclosure can be used for an electronic device such as a spindle motor or a hard disk drive device, and a base member to be used in the same.

While preferred embodiments of the invention have been described as above, it is to be understood that variations and modifications will be apparent to those skilled in the art without departing from the scope and spirit of the invention. The scope of the invention, therefore, is to be determined solely by the following claims.

What is claimed is:

1. A base member serving as a part of a housing of a hard disk drive device, the base member comprising:
   a base body being a cast product;
   a machined portion and a casting surface equipped on the base body;
   an impregnating agent filled into a casting cavity exposed at the machined portion, wherein the impregnating agent is filled into the casting cavity by a vacuum impregnation process; and
   a coating film covering a surface including the machined portion of the base body,
      wherein on the casting cavity exposed at the machined portion, the impregnating agent is also filled in the casting cavity having an outermost diameter being equal to or smaller than 20 µm.

2. The base member according to claim 1, wherein the machined portion is a surface facing an outer peripheral edge of a hard disk.

3. The base member according to claim 1, wherein the coating film is formed by electrodeposition coating, and the impregnating agent is made of electrically conductive resin.

4. A spindle motor comprising:
   the base member according to claim 1.

5. A hard disk drive device comprising:
   the spindle motor according to claim 4.

6. A base member serving as a part of a housing of a hard disk drive device, the base member comprising:
   a base body being a cast product;
   a machined portion and a casting surface equipped on the base body;
   a first casting cavity exposed at the machined portion, the first casting cavity having an outermost diameter being equal to or smaller than 20 µm;
   a second casting cavity exposed at the machined portion, the second casting cavity having an outermost diameter being larger than 20 µm;
   an impregnating agent filled into both first and second cavities, wherein the impregnating agent is filled into the first and second cavities by a vacuum impregnation process; and
   a coating film covering a surface including the machined portion of the base body.

7. The base member according to claim 6, wherein the machined portion is a surface facing an outer peripheral edge of a hard disk.

8. The base member according to claim 6, wherein the coating film is formed by electrodeposition coating, and the impregnating agent is made of electrically conductive resin.

9. A spindle motor comprising:
   the base member according to claim 6.

10. A hard disk drive device comprising:
the spindle motor according to claim 9.

\* \* \* \* \*